Apr. 3, 1923.
W. W. HUDSON
1,450,633
SELF WATERING FLOWERPOT
Filed May 14, 1921
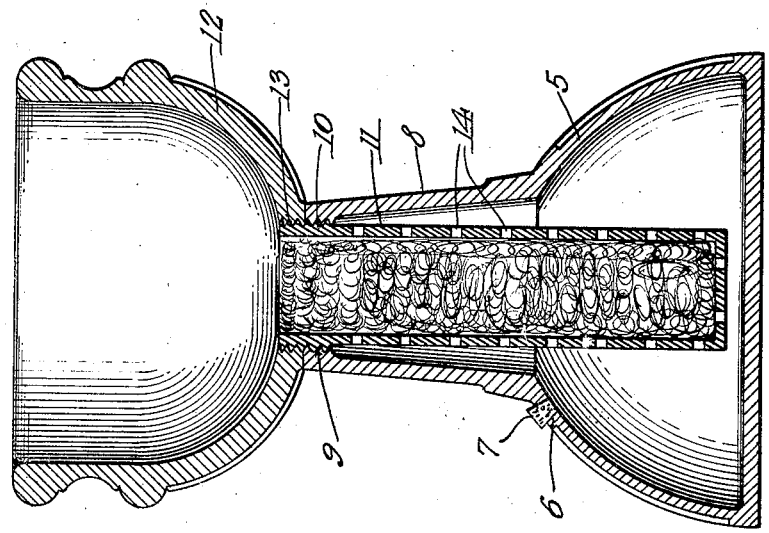
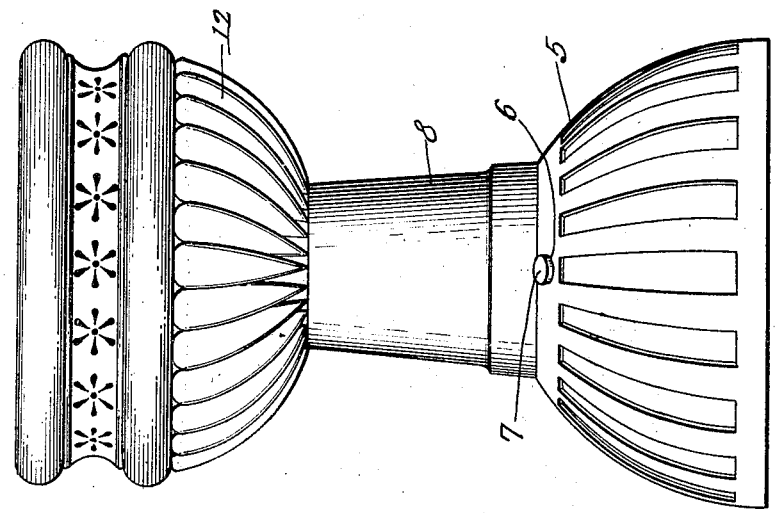
Inventor
Willard W. Hudson
By Dan Peller Moore,
Attorney Patented Apr. 3, 1923.

1,450,633

UNITED STATES PATENT OFFICE.

WILLARD W. HUDSON, OF SHELBYVILLE, ILLINOIS.

SELF-WATERING FLOWERPOT.

Application filed May 14, 1921. Serial No. 469,543.

*To all whom it may concern:*

Be it known that I, WILLARD W. HUDSON, a citizen of the United States, residing at Shelbyville, in the county of Shelby and State of Illinois, have invented certain new and useful Improvements in Self-Watering Flowerpots, of which the following is a specification.

This invention relates to improvements in self-watering flower pots, one object of the invention being the provision of an ornamental and useful device of this character in which the base supplies water to the earth in which the roots are planted, by capillary attraction.

A further object of this invention is the provision of a device of this character which consists primarily of three elements, the earth and plant carrying member, the capillary attraction tube which constitutes a connecting member for the first member, and a base or water carrying member which is attached to the earth carrying or pot member by the intermediate member, above referred to, thus providing in a uniform member a thoroughly practical and useful device.

In the accompanying drawings:

Figure 1 is a side elevation of the complete pot.

Figure 2 is a vertical central sectional view thereof.

Referring to the drawings, the numeral 5 designates the base member having the filling opening 6 with the closure 7, which may be of any desired shape or form, here shown as a stopper. The reduced pedestal portion 8 of the base is provided with interior screw threads at 9 for the reception of a portion of the screw threads 10 of the perforated tube or cylinder 11, which extends down into the base to a point adjacent the bottom thereof and forms a connecting means between the base and the earth and plant carrying member 12, which is provided with the threaded opening 13 for engagement with the threads 10 of the member 11.

As above stated, the member 11 is provided with perforations 14 through which the water supplied in the base is delivered. In order to assist in the capillary feeding of the water to the member 12 anything porous such as raw cotton or earth may be disposed in the member 11 as the filler.

The member 11 is what I term a wick and can be made of metal or earthenware or any other material so constructed as to insure the delivery of water from the base to the pot.

What I claim as new is:

A self-watering flower vase or pot including a hollow base member having a reduced hollow pedestal with interior screw threads at the mouth thereof, a pot having a concentric screw threaded opening adapted to aline with the opening of the pedestal and to rest thereon, and a hollow tube having screw threads to engage the hollow portion of the pedestal and pot to hold the members together and providing means for supplying water from the base to the pot.

In testimony whereof I affix my signature.

WILLARD W. HUDSON.